United States Patent [19]

Brammer, Jr.

[11] 4,053,356
[45] Oct. 11, 9177

[54] GUIDE DEVICE

[75] Inventor: Chris M. Brammer, Jr., Houston, Tex.

[73] Assignee: Westinghouse Electric Corporation, Pittsburgh, Pa.

[21] Appl. No.: 603,077

[22] Filed: Aug. 8, 1975

[51] Int. Cl.² .................................................. G21C 19/16
[52] U.S. Cl. .......................................... 176/30; 176/87
[58] Field of Search ....................................... 176/30–32, 176/87

[56] References Cited

U.S. PATENT DOCUMENTS

| 3,072,554 | 1/1963 | Madsen | 176/31 |
| 3,179,266 | 4/1965 | Lemesle et al. | 176/30 |
| 3,271,262 | 9/1966 | Hutchinson et al. | 176/30 |
| 3,437,558 | 4/1969 | Gunson et al. | 176/30 |
| 3,773,616 | 11/1973 | Aubent | 176/30 |
| 3,841,964 | 10/1974 | Dumayne | 176/30 |
| 3,909,350 | 9/1975 | Dupuy | 176/30 |

FOREIGN PATENT DOCUMENTS

| 657,273 | 12/1963 | Belgium | 176/30 |
| 1,059,120 | 6/1959 | Germany | 176/30 |
| 47-7840 | 6/1972 | Japan | 176/30 |
| 1,101,263 | 1/1968 | United Kingdom | 176/30 |

Primary Examiner—Samuel W. Engle
Assistant Examiner—S. A. Cangialosi
Attorney, Agent, or Firm—M. S. Yatsko; Z. L. Dermer

[57] ABSTRACT

A fuel handling guide tube centering device for use in nuclear reactors during fuel assembly handling operations. The device comprises an outer ring secured to the flange of a nuclear reactor pressure vessel, a rotatable table rotatably coupled to the outer ring, and a plurality of openings through the table. Truncated locating cones are positioned in each of the openings in the table, and the locating cones center the guide tube during fuel handling operations. The openings in the table are located such that each fuel assembly in the nuclear core may be aligned with one of the openings by a suitable rotation of the table. The locating cones thereby provide alignment between the fuel handling mechanism located in the guide tube and the individual fuel assemblies of the cone. The need for a device to provide alignment is especially critical for floating nuclear power plants, where wave motion may exist during fuel handling operations.

5 Claims, 4 Drawing Figures

GUIDE DEVICE

BACKGROUND OF THE INVENTION

This invention relates generally to nuclear reactors and more particularly to a guide tube centering device for use in nuclear reactors during fuel assembly handling operations.

A nuclear reactor produces heat by the fissioning of nuclear materials located in fuel rods which are assembled in fuel assemblies. A plurality of these fuel assemblies comprises a nuclear core, and the nuclear core is situated in a nuclear reactor pressure vessel. In pressurized water nuclear reactors, the nuclear core is generally of the open lattice variety in which the individual fuel assemblies are located adjacent to one another without any structural separation.

During the course of reactor operation certain fuel assemblies tend to burn up the fissile material more rapidly than other fuel assemblies. In order to maximize the life of the core, it is a customary practice in nuclear reactors to shuffle the fuel assemblies. By shuffling, it is meant that the fuel assemblies which burn up more rapidly are removed from the core, and the fuel assemblies which had been positioned in the slower depletion regions are moved to the locations of higher material depletions. By so shuffling the fuel assemblies, the useful life of the individual fuel assemblies is prolonged.

During replacement, the depleted fuel assemblies are removed from the core to a storage container, and new fuel assemblies are inserted into certain predetermined positions in the nuclear core. During both shuffling operations and replacement operations, it is necessary for the individual fuel assemblies to be vertically raised out of the nuclear core. To accomplish this vertical movement, a fuel handling mechanism is generally positioned above the pressure vessel, and is inserted downward to engage the fuel assemblies, and is then reversed to vertically move the fuel assemblies out of the core.

In pressurized water reactors, and other nuclear reactors utilizing open vessel refueling techniques, the pressure vessel closure head and the upper internals structure are removed prior to refueling operations. A manipulator crane is then positioned vertically above the nuclear core. The manipulator crane generally has a downward vertical extension commonly called a mast. This mast is generally comprised of two parts: a stationary mast, which extends vertically downward to an elevation above the open reactor vessel; and a telescoping guide tube which extends from the stationary mast to the fuel elements. A fuel handling mechanism is generally installed within the guide tube, and this fuel handling mechanism contacts the individual fuel assembly.

In an open lattice core, the individual fuel assemblies are located approximately 0.04 inches (0.1016 cm.) apart. Because of the close proximity of adjacent fuel assemblies, the guide tube, and its related fuel handling mechanism, must maintain an exact alignment with the fuel assembly to be removed. A misalignment of 0.5 inch (1.27 cm.) can cause an unstable connection between the fuel handling mechanism and the fuel assembly, and possibly result in damage to adjacent fuel assemblies. Thus, it is important to maintain vertical alignment between the guide tube and its fuel handling mechanism, and the individual fuel assembly.

In conventional nuclear reactors, misalignment can occur because of the nature of the telescoping guide tubes. Rollers must be inserted into the stationary mast to enable the guide tube to descend downward approximately 40 feet (13.92 meter) into the pressure vessel. These rollers are generally positioned around the inside of the stationary mast so as to maintain a constant pressure against the guide tube. However, the rollers may possess different tensioning, and result in a deflection of the guide tube. This deflection of the guide tube then causes a misalignment of the fuel handling mechanism, and could result in a fuel handling accident. Additionally, misalignment may occur because of refueling cavity water clarity problems.

Because of the reluctance of segments of the population to have nuclear reactors constructed in their geographical vicinity, the possibility of building nuclear plants in the oceans is being seriously investigated. The electricity generated by these offshore power plants would be transferred to land by high voltage transmission lines. These power plants would be constructed on land, on movable barges, and would then be towed to their desired position where they would be secured to the ocean floor. These offshore nuclear power plants would then provide electricity to large geographical areas without alienating segments of the population who do not want nuclear installations in their geographical vicinity.

The aforementioned problem of maintaining alignment during fuel handling operations is one of the many problems associated with designing an offshore nuclear installation. In addition to the misalignment problems previously mentioned, an offshore nuclear installation has alignment problems resulting from the forces imparted to the installation by wave movements generated in the ocean. Even through anchored to the ocean floor, the installation will nevertheless be subjected to roll caused by wave motion. Although this roll may seem minimal, generally one-half degree of less, it is a serious concern when considered in conjunction with the fuel handling operation. A one-half degree roll at the manipulator crane will cause a serious deflection at the end of the guide tube, some 40 feet (13.92 meter) away when extended, and could cause misalignments greater than the permissible 0.5 inches (1.27 cm). Therefore, it is necessary to provide a centering device to maintain alignment between the guide tube, and its associated fuel handling mechanism, and the individual fuel assemblies during refueling operations.

SUMMARY OF THE INVENTION

The aforementioned necessity is fulfilled by this invention by providing a guide device for use in nuclear reactors during fuel assembly handling operations. A cylindrical connecting member is secured to the flange of a nuclear reactor pressure vessel, and into the opening of this connecting member is inserted a rotatable support or table. The rotatable support or table is rotatably secured to the connecting member, and the support or table has a plurality of openings therethrough. Into each of the openings in the support or table is inserted locating means. The openings in the support are located such that each of the fuel assemblies of the nuclear core, situated in the pressure vessel, will be in alignment with at least one of the openings by suitable rotation of the support. Included also are means for rotating the support. The guide tube is then maintained in alignment with the fuel assemblies by the locating means positioned in the openings of the support.

BRIEF DESCRIPTION OF THE DRAWINGS

Reference is now made to the description of the preferred embodiment illustrated in the accompanying drawings, in which.

DESCRIPTION OF THE PREFERRED EMBODIMENT

Figure 1:
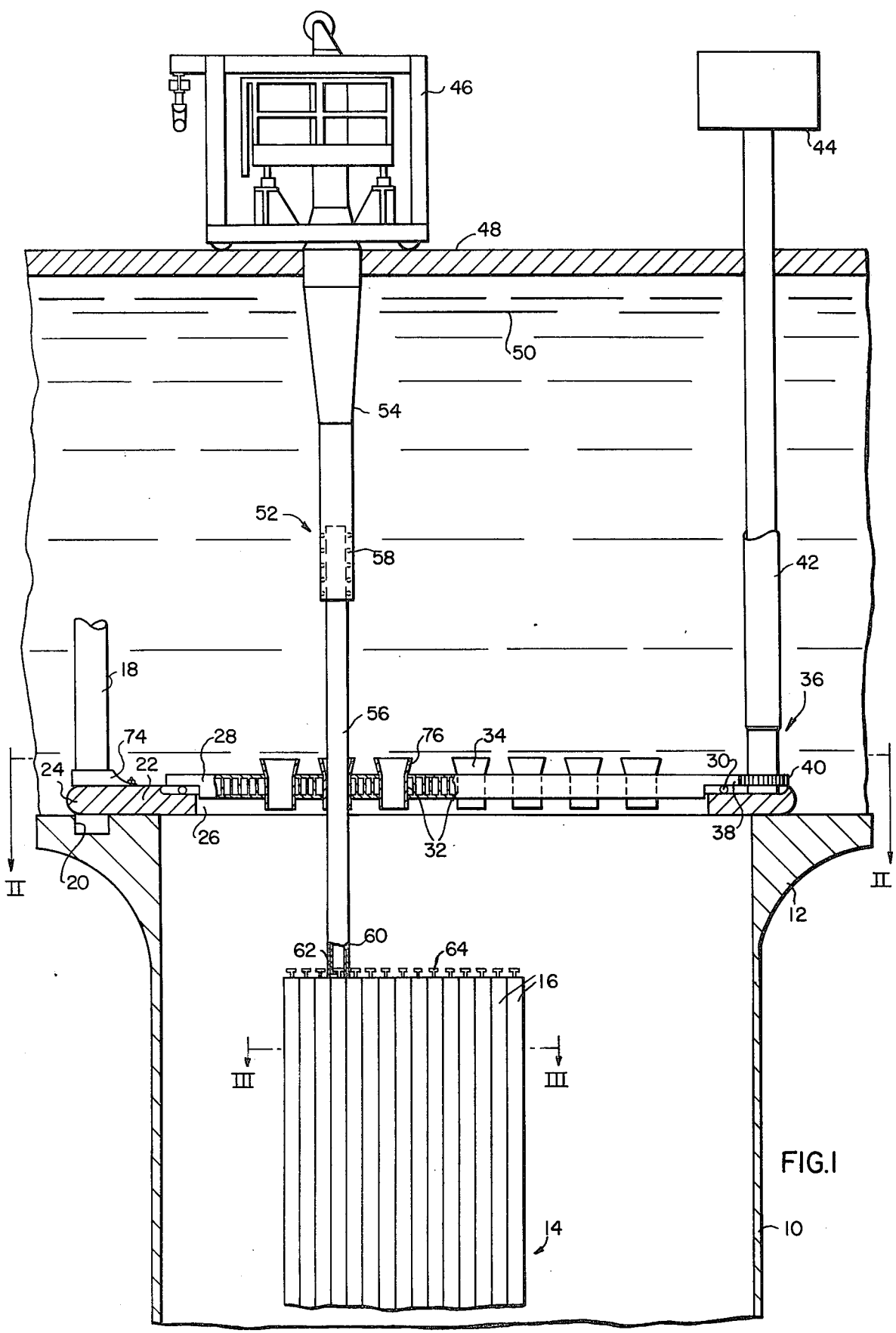
FIG. 1 is an elevation view of a nuclear reactor utilizing this invention.

Throughout the description which follows, like reference characters indicate like elements in the various figures of the drawing.

FIG. 1 schematically illustrates a nuclear reactor utilizing the principles of the invention. A generally cylindrical nuclear reactor pressure vessel 10 has an annular flange 12 around the top periphery thereof. A nuclear core 14, comprised of a plurality of elongated fuel assemblies 16, is positioned within the pressure vessel 10. During normal reactor operation, a pressure vessel closure head (not shown) is secured to the flange 12 of the pressure vessel 10, and an upper internals structure (not shown) is positioned above the nuclear core 14. However, since this invention is directed toward removal and replacement of fuel assemblies during refueling operations, both the closure head and the upper internals structure are not shown in FIG. 1 because they are removed prior to refueling.

A plurality of guide studs 18 are inserted into openings 20 in the pressure vessel flange 12. A cylindrical connecting member, such as the outer ring 22, is secured to the flange 12 of the pressure vessel 10. The outer ring 22 is correctly positioned on the flange 12 by means of a plurality of guide stud sleeves 24, which receive the guide studs 18 through complimentary openings 25 in FIG. 2. The outer ring 22 has an opening 26 into which a generally planar, cylindrical rotatable means such as the support or table, 28 is positioned. The support or table, 28 is rotatably supported by the outer ring 22 by means 30 such as bearings.

The support or table 28 has a plurality of openings 32 into which locating means, such as truncated cones 34 are inserted. Means 36 for rotating the support or table 28 are also provided. As illustrated, the table rotation means 36 comprise gear teeth 38 around the outer periphery of the table 28, and a gear 40 which is connected to the drive shaft 42 of a mechanical drive assembly 44. The mechanical drive assembly 44 can be operated either manually or by electrical means.

A manipulator crane 46 is positioned above the pressure vessel 10. The manipulator crane 46 operates on rails 48 by which it can be positioned over all core 14 locations, in a manner well known in the art. The crane 46 is located above the level of coolant 50 present during refueling operations, and provides an initial, approximate alignment of the guide tube 56 with the fuel assemblies 16. The manipulator crane 46 has a vertical extension 52 beneath it. The vertical extension 52 is comprised of two sections: a stationary mast section 54, and a telescoping guide tube 56. The telescoping guide tube 56 is permitted vertical movement by means of the rollers 58 between it and the stationary mast 54.

Located within the guide tube 56 is the fuel handling mechanism 60. The fuel handling mechanism 60 has, at its bottom end, a gripper 62 which engages the top 64 of the fuel assemblies 16. The gripper 62 is of a construction well known in the art, and functions by being placed adjacent the top 64 of the fuel assemblies. The gripper 62 then engages the fuel assembly top 64, is closed while engaged to the top 64, and is able to withdraw the fuel assembly 16 from the core 14 when the guide tube 56 is telescoped back into the stationary mast section 54. During fuel handling operations the guide tube 56, and its associated fuel handling mechanism 60, is kept in precise alignment with the individual fuel assembly 16 by the locating cones 34.

Figure 3:
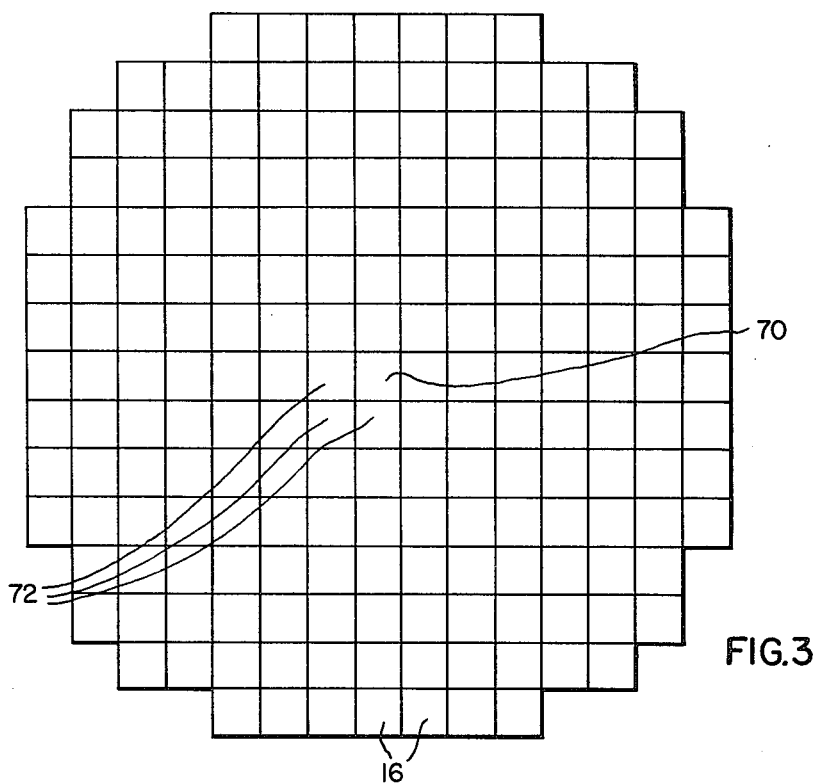
FIG. 3 is a plan view taken along line III—III of FIG. 1.

The individual fuel assemblies 16 are positioned adjacent each other, FIG. 3, and separated by a distance of approximately 0.04 inches (0.1016 cm). The guide tube 56 and the fuel handling mechanism 60 must be maintained in alignment with the fuel assemblies 16 so that the gripper 62 will be able to contact the top 64 of the fuel assembly 16 adequately.

Figure 2:
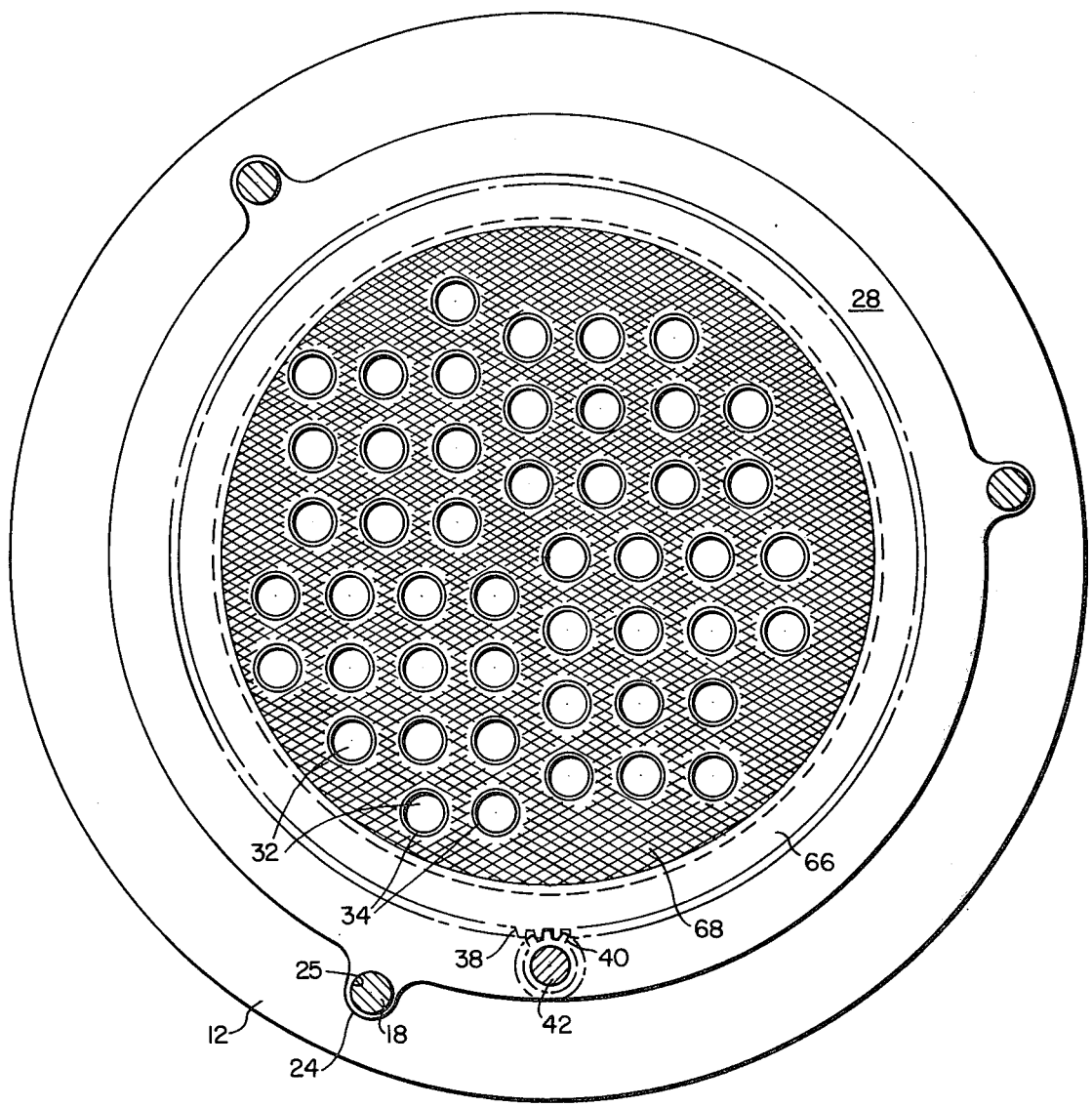
FIG. 2 is a plan view taken along line II—II of FIG. 1.

FIG. 2 illustrates a plan view of the guide device. The support or table 28 is comprised of a rigid cellular structure 68, and has a flange portion 66. Gear teeth 38 machined on the outer peripheral surface of the flange portion 66 mesh with gear 40 which imparts rotational movement to table 28 and cones 34 positioned therein. The table 28 has a plurality of openings 32 into which locating cones 34 are positioned. The openings 32, and the corresponding locating cones 34, are located in the cellular structure 68 such that, by suitable rotation of the table 28, each individual fuel assembly 16 will be in direct alignment with a cone 34.

The openings 32 above the fuel assemblies 16 cannot be constructed in a line; that is, the fuel assemblies 16 in a row cannot have corresponding openings 32 in a row, because, with the truncated cones 34 in the openings, the necessary distances between the cones 34 are greater than the distances between the fuel assemblies 16. Therefore, the openings 32 must be staggered to function in the preferred manner, wherever possible, each opening 32 will be in alignment with a plurality of fuel assemblies 16 upon rotation of the table 28.

Because the cones 34 have ratially outward extensions 76 which extend outward beyond the edge of the openings 32, it is not possible to provide direct alignment with both the center fuel assembly 70, FIG. 3, and with each assembly 72 which surrounds the center fuel assembly 70. As a matter of practicality, since the surrounding fuel assemblies 72 are more numerous than the one center fuel assembly 70, the surrounding fuel assemblies 72 have corresponding openings 32 which are in direct alignment with them, whereas the center fuel assembly 70 has no opening. For this reason, the center fuel assembly 70 must be exchanged either prior to, or subsequent to, the installation of the table 28. Because the individual fuel assemblies 16 are symmetrical about the center fuel assembly 70, each opening 32 will be able to provide direct alignment with more than one fuel assembly 16. This permits the use of the locating cones 34.

Fuel handling operations occur in the following manner. The outer ring 22 is positioned on the pressure vessel flange 12, located by the guide stud sleeve 18 and the guide stud sleeve 24, and secured to the pressure vessel flange 12 by means 74 such as clamps or latches. The table 28 is indexed above the fuel assemblies 16, and the telescoping guide tube 56 is lowered. As the guide tube 56 is lowered, it is aligned and centered by the radially outward extension 76 of the locating cone 34. The extension 76 then guides the guide tube 56 through the cone 34 and the opening 32, and maintains this direct alignment to a fuel assembly 16. If sufficient wave motion exists, the guide tube 56 may contact radially outward extention 76, thereby preventing the guide tube 56 from further vertical downward motion until it is placed into precise alignment with an individual fuel assembly 16. The fuel handling mechanism 60 then contacts the top 64 of the fuel assembly 16, and can remove it.

After the fuel assemblies 16 which are in alignment with the openings 32 are removed, the table 28 can then be indexed by table rotation means 36, and the openings 32 will then be in alignment with other fuel assemblies 16. The process is then repeated until all desired fuel assemblies 16 have been removed or inserted. With the knowledge as to which fuel assemblies 16 are in alignment with which locating cones 34, the number of table rotations can be minimized. As an example, for the embodiment illustrated, only four table rotations are required.

Figure 4:
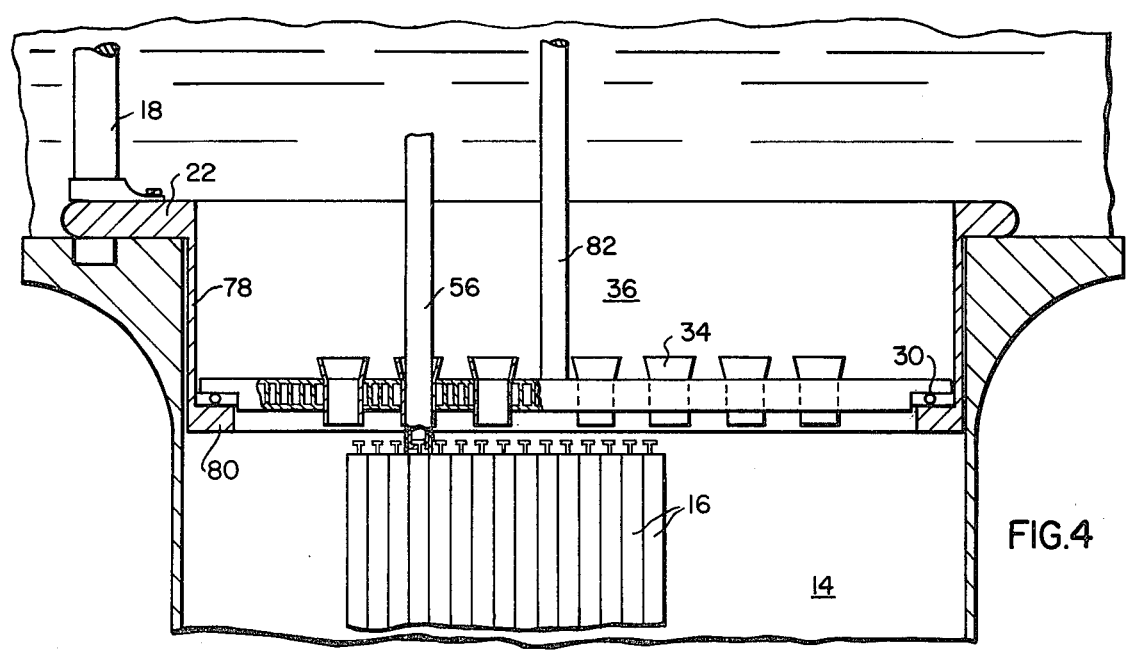
FIG. 4 is a modification of the device shown in FIG. 1.

FIG. 4 illustrates a modification of the device illustrated in FIG. 1. Instead of the table 28 being at approximately the same elevation as the flange 12, the table 28 is located below the flange 12 and just above the core 14. The outer ring 22 has a downward extension 78. The table 28 is mounted on the bottom 80 of the downward extension 78. The means 36 for table rotation can be either the gear mechanisms described previously with the table 28 fixedly secured to the downward extension, or, if desired, could be a shaft 82 secured adjacent the center of the table 28, while the table 28 is rotatably supported by the extension 78 by means such as the bearing 30. Then upon rotation of the shaft 82, by either manual or electrical means (not shown), the table 28 will rotate.

Thus, what is provided is a guide tube centering device which maintains alignment between fuel assemblies and fuel handling mechanism, for use in nuclear reactors during fuel assembly handling operations.

I claim as my invention:

1. A guide device for use in nuclear reactors during fuel handling operations comprising:
   an open-ended nuclear reactor pressure vessel having a flange around the top periphery thereof, said pressure vessel having a nuclear core positioned therein, said nuclear core comprising:
   an elongated center fuel assembly;
   a plurality of similar elongated fuel assemblies said plurality of elongated fuel assemblies being positioned symmetrically about said center fuel assembly;
   a member supported by said pressure vessel flange, said member having an opening therein, said opening having a horizontal size at least as large as said core size;
   a rotatable support positioned in said member opening, said rotatable support being rotatably supported by said member, said support having a plurality of openings therein, said support openings being positioned in a predetermined pattern in said support so that by rotation of said rotatable support, each of said fuel assemblies except said center fuel assembly is in alignment with at least one of said support openings;
   a truncated cone positioned in each of said support openings, said cones having radial extensions extending radially outwardly beyond said support openings, said truncated cones being longitudinally spaced-apart from said fuel assemblies; and
   a device for rotating said rotatable support.

2. The device according to claim 1 wherein said member includes a depending section which extends downwardly into said pressure vessel, said section having a flange integrally formed therewith for supporting said rotatable support.

3. The device according to claim 1 wherein said rotatable support is substantially a rigid cellular structure.

4. The device according to claim 1 wherein said device for rotating said rotatable support comprises:
   a plurality of gear teeth on the outer periphery of said rotatable support;
   a drive shaft;
   a gear secured to said drive shaft, said gear engaging said rotatable support gear teeth to impart rotational movement to said rotatable support; and
   means for imparting rotational movement to said drive shaft.

5. The device according to claim 1 wherein:
   said member being an outer ring;
   said rotatable support being a generally planar, cylindrical, cellular table; and
   a bearing is located between said outer ring and said table, said outer ring supporting said table through said bearing.

* * * * *